(12) United States Patent
Sesti

(10) Patent No.: US 9,329,198 B2
(45) Date of Patent: May 3, 2016

(54) DIRECTION PROCESSING BASED ON MULTI-STATE INPUTS

(71) Applicant: The Port Authority of New York and New Jersey, New York, NY (US)

(72) Inventor: Julio Sesti, Weehawken, NJ (US)

(73) Assignee: Port Authority of New York & New Jersey, New York, NY (US)

( * ) Notice: Subject to any disclaimer, the term of this patent is extended or adjusted under 35 U.S.C. 154(b) by 26 days.

(21) Appl. No.: 14/322,624

(22) Filed: Jul. 2, 2014

(65) Prior Publication Data

US 2014/0316739 A1 Oct. 23, 2014

Related U.S. Application Data

(63) Continuation-in-part of application No. 13/213,748, filed on Aug. 19, 2011, now Pat. No. 8,775,116.

(60) Provisional application No. 61/375,696, filed on Aug. 20, 2010.

(51) Int. Cl.
*G01P 13/04* (2006.01)

(52) U.S. Cl.
CPC ..................... *G01P 13/04* (2013.01)

(58) Field of Classification Search
CPC ....... G01P 13/04; B60T 7/122; B60T 8/4872; B60T 2201/06; B60K 31/00; Y10T 477/648; Y10T 477/644; Y10T 477/647; Y10T 477/649; B60W 2520/06

USPC ......... 702/150; 324/207.18, 207.24; 701/117, 701/118, 119, 469; 348/169, 355; 705/11; 340/917

See application file for complete search history.

(56) References Cited

U.S. PATENT DOCUMENTS

| 6,390,949 | B1 * | 5/2002 | Kondo et al. | 477/143 |
| 7,761,205 | B2 * | 7/2010 | Onuma et al. | 701/36 |
| 8,326,488 | B2 * | 12/2012 | Onuma et al. | 701/38 |
| 8,340,881 | B2 * | 12/2012 | O'Dea et al. | 701/71 |
| 8,483,940 | B2 * | 7/2013 | Chapman et al. | 701/117 |
| 2008/0319624 | A1 * | 12/2008 | Aizawa et al. | 701/70 |

(Continued)

OTHER PUBLICATIONS

"Propeller Professional Development Board Schematic", Parallax, Inc. (2008).

(Continued)

*Primary Examiner* — Carol S Tsai
(74) *Attorney, Agent, or Firm* — White & Case LLP

(57) ABSTRACT

A computer-implemented method for determining the direction of a moving object across a sensor having a plurality of inputs is disclosed. The invention determines the direction of a moving object, such as a vehicle on a roadway, based on inputs provided by sensors along the object's path. The methods involve monitoring state changes of the inputs as the object passes the sensor and comparing the magnitude of state changes in the order in which a forward-moving object would cause inputs to switch to a particular state. For each state change comparison, a direction variable is adjusted to indicate forward or reverse movement. After passage of the object, a direction of movement is assigned to the moving object on the basis of the final value of the direction variable. The invention provides a high degree of accuracy, is simple to reconfigure, and more economical than other methods.

16 Claims, 1 Drawing Sheet

(56) References Cited

U.S. PATENT DOCUMENTS

2010/0315505 A1* 12/2010 Michalke et al. ............ 348/118
2011/0173015 A1* 7/2011 Chapman et al. ............ 705/1.1
2011/0276242 A1* 11/2011 O'Dea et al. ................. 701/70
2012/0150425 A1* 6/2012 Chapman et al. ............ 701/119
2013/0289862 A1* 10/2013 Chapman et al. ............ 701/118

OTHER PUBLICATIONS

"Propeller Professional Development Board (#32111)", Parallax, Inc. (2008).
"Propeller Education Kit Labs-Fundamentals", Parallax, Inc. (2009).
"Propeller Manual", version 1.01 (2006); and "Supplement and Errata for Propeller Manual" v.1.0, Parallax, Inc. (2007).
"Propeller P8X32A Datasheet," Parallax, Inc. (2009).

* cited by examiner

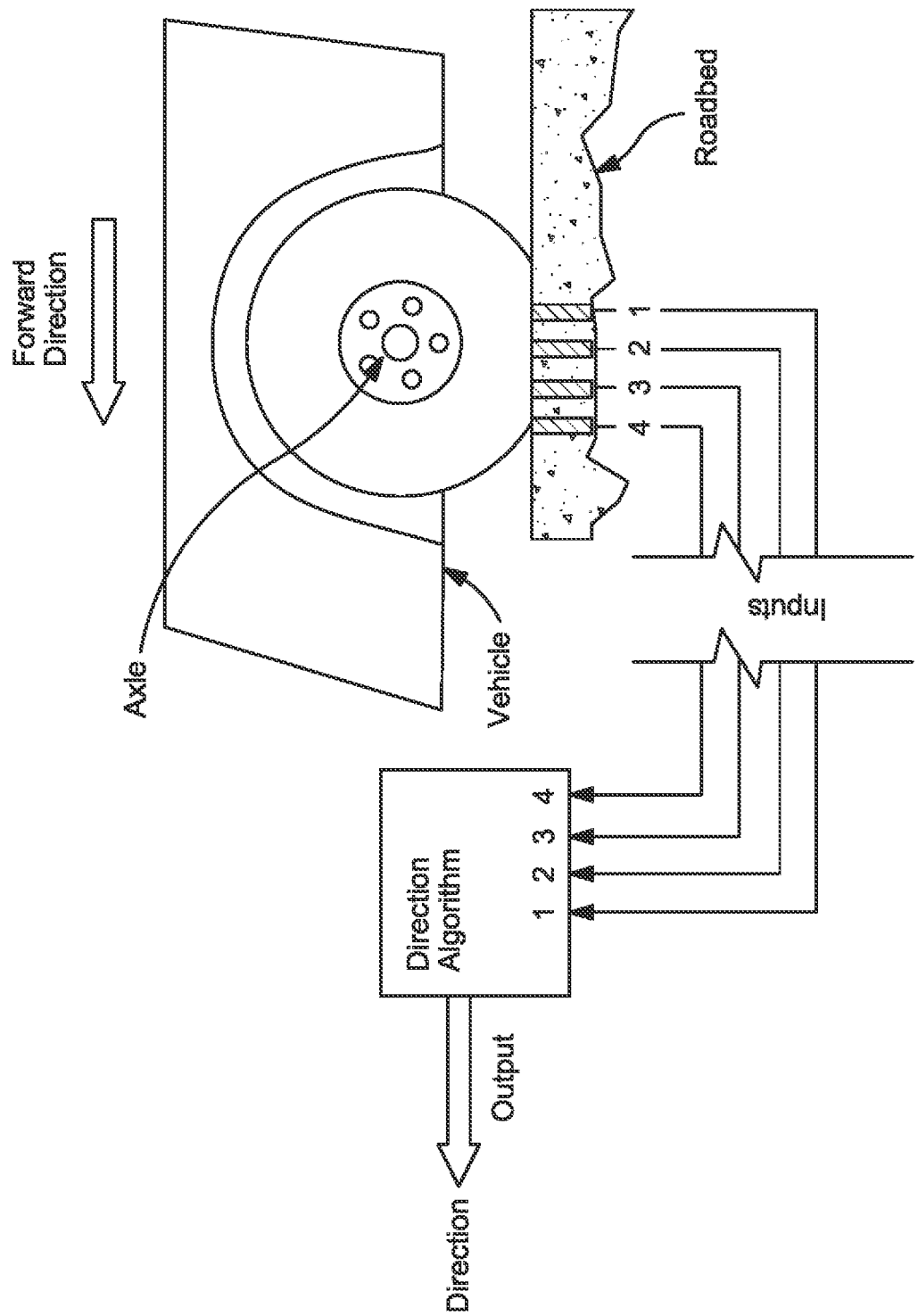

DIRECTION PROCESSING BASED ON MULTI-STATE INPUTS

This application is a continuation-in-part of U.S. patent application Ser. No. 13/213,748, filed on Aug. 19, 2011, which claims the priority benefit of U.S. provisional patent application Ser. No. 61/375,696, filed on Aug. 20, 2010. The contents of each of these applications are incorporated herein by reference in their entirety.

BACKGROUND OF THE INVENTION

It is desirable to automatically and accurately determine the direction of a moving object, such as a car or other vehicle traveling on a road or highway, based on inputs provided by sensors along the object's path.

Currently known methods and systems may include the use of a truth table to determine a moving object's direction as it triggers sensors along its path. Truth tables use a pre-populated list of input state sequences paired with the corresponding direction of the moving object. A disadvantage to truth tables is that if a sequence is not found in the truth table, a direction cannot be determined.

Other currently known methods and systems implement the use of neural networks. Neural networks are very sophisticated modeling techniques capable of modeling extremely complex functions. Neural networks learn by example as opposed to having the logic established by a user. Although these systems may determine a moving object's direction with a high degree of accuracy, they are very expensive and complex to reconfigure at will.

There is, therefore, an increasing but unmet demand for methods and systems to determine the direction of a moving object, such as a car or other vehicle on a roadway, based on inputs provided by sensors along the object's path that result in a high degree of accuracy, but are simple to reconfigure and are more economical than other currently known solutions.

BRIEF DESCRIPTION OF THE INVENTION

The present invention is intended to address the above problems associated with determining the direction of a moving object. One aspect of the present invention is directed to a computer-implemented method for determining the direction of a moving object across a primary sensor having a plurality of inputs.

The method comprises assigning an initial value to a direction variable and monitoring state changes of the inputs as the moving object passes across the sensor. Upon detection of a state change of a particular input from a lowest state to a higher state, the system compares the magnitude of the state changes in the order in which a forward-moving object would cause inputs to switch to a particular state. That is, the system compares the magnitude of the state changes of the input which just changed, to the magnitudes of the states of the remaining inputs which have not changed, in the order in which a forward-moving object would cause inputs to switch to a particular state. For each comparison, the value of the direction variable is (a) incremented by a fixed amount to indicate a forward-moving object, or (b) decremented by the fixed amount to indicate a reverse-moving object.

The system monitors the order of state changes for all inputs until all inputs return to their lowest state. For a forward moving object, this return of the inputs to their lowest state indicates that the moving object has moved past the sensor. After the object is no longer triggering the sensor, a direction of movement is assigned to the moving object on the basis of the final value of the direction variable.

The moving object may have any kind of structure. For example, the moving object may be a vehicle, such as a truck, car, van, or train, or the moving object may be a part of the vehicle, such as a wheel or axle.

The sensor may have any kind of structure which allows for detection of the moving object across the sensor. If the moving object is a vehicle traveling over a road, the sensor may be a treadle pad as is known in the art. Alternatively, the sensor may be a set of electro-mechanical or optical inputs or switches which are affixed to a surface such as a road, street, or wall, or ceiling. The sensor may be affixed to, suspended over, or mounted along any kind of surface, such as the previously-described road, street, wall, or ceiling. That is, the sensor may be affixed directly to a surface along which the object is moving, or the sensor may be mounted on a support (such as a post, pole, or beam) or other structure and be located a particular distance away from the surface. For example, the sensor may be mounted to or suspended from a roof or overhead beam, or the sensor may be mounted on a pole on the side of a road. Any of such embodiments are encompassed by the present invention.

The step of comparing the magnitude of the state changes may comprise evaluating a plurality of arrays, each array representing a particular state and having a plurality of elements, each element representing a particular input. The value stored in each element can represent the order in which the particular input transitioned to that particular state in comparison to the other inputs. The inputs undergo a state change when the object moves across the sensor. The corresponding array element is a variable which stores a value that represents the order in which that particular input changed to a specific state relative to the rest of the inputs.

The method may also comprise recording only the most recent state change if a particular input undergoes a plurality of state changes. That is, if a particular input undergoes several state changes while registering the movement of the vehicle or other moving object, for example, due to malfunction or inconclusive movement on the part of the operator of the vehicle, the system may utilize only the last or most recent state change in determining the direction of movement of the object.

The inputs to the sensor may be discrete, for example, binary having two states such as up/down, zero/one, or high/low; ternary having three states such as high/middle/low; quaternary having four states, etc., or continuous, in which the states which may have any value within a range.

The method may also comprise ceasing to monitor a particular input if the input remains in a particular state for a predefined period of time. If the input subsequently switches to another state, monitoring of the particular input can be re-established.

The method may also comprise detecting the presence of the moving object using a secondary (or tertiary, or higher-numbered) sensor. The secondary sensor may function on the same or different operating principle as a primary sensor. The data from the secondary sensor can be utilized by the system or computer to assign the direction of movement. A secondary sensor may be located at the same position as the primary sensor, or it may be located at a different location.

The method may also comprise comparing the final value of the direction variable to a pre-assigned confidence level threshold. If the direction variable is greater than or outside of the confidence level threshold, a direction of movement can be assigned to the moving object. For example, if the calculated directional variable is +12 and the confidence level threshold has a range of from −3 to +3, then the direction variable (+12) is outside the confidence level threshold and therefore indicates that a forward moving object has passed the sensor. If the direction variable is within the confidence level threshold, a direction of movement can be considered as unknown. For example, if the calculated direction variable is −2 and the confidence level threshold has a range of from −3 to +3, the direction variable (−2) is not outside of the confidence level threshold, and the object's direction would be identified as "unknown". Confidence level thresholds will generally be situation-specific, and can be modified or adjusted by the user or administration personnel as appropriate.

The steps of the method can be performed by any component within the system. For example, the method can be performed by a microcontroller located on a printed circuit board. The microcontroller would be programmed with computer instructions or processor code for carrying out the method. The steps of the method can also be performed by the computer on the basis of any other convenient data collection and data processing means.

The method may further comprise outputting the direction of the moving object to an external device to permit an operator to observe a running list of objects and their direction of movement. The external device can be any kind of device which allows for display or storage of data, such as a printer, database, spreadsheet, computer monitor, data storage unit, tablet device, or a handheld computer.

In particular embodiments, it may be useful to output the direction of the moving object to a subsequent separate computer process. The separate process may be running in the same computer, or the separate process may be performed by a different computer linked to the first computer. For example, after a direction of movement is determined, the data can be forwarded to a second computer which processes or determines tolls and bills the owner of the vehicle or other moving object. Other kinds of separate computer processes are possible and within the scope of the present invention.

Another aspect of the invention is directed to a computer-readable storage medium containing computer-readable code for programming a computer to determine the direction of a moving object across a sensor having a plurality of inputs. The computer-readable storage medium contains computer-readable code for performing the invention. The storage medium can be any device which temporarily or permanently stores the computer-readable code, such as a CD, DVD, USB memory stick, flash card, or hard drive. In particular embodiments, the storage medium can also contain general operation code, installation files, program files, or drivers necessary to interact with or control the computer.

Another aspect of the invention is directed to a computer program product comprising a computer-readable medium having computer-readable code embodied therein. The computer-readable medium contains computer-readable code for performing the invention.

Another aspect of the invention is directed to a programmable printed circuit board comprising computer readable code embodied therein for performing the invention. The board may be provided with the computer instructions by uploading computer-readable code using an installation program as is known in the art.

These aspects of the invention have provided methods and systems which advance the ability to automatically and accurately determine the direction of a moving object using all inputs of a sensor. Additional aspects of the invention permit identification of the direction of a moving object using immediately adjacent and enabled inputs of a sensor instead of using all inputs of the sensor.

In this regard, another aspect of the present invention is directed to a computer-implemented method for determining the direction of a moving object across a primary sensor having a plurality of inputs. The method comprises assigning an initial value to a direction variable and monitoring state changes of the inputs as the moving object passes across the sensor. Upon detection of a state change of a particular input from a lowest state to a higher state, the system compares the magnitude of the state changes of the particular input to its immediately adjacent and enabled inputs in the order in which a forward-moving object would cause inputs to switch to a particular state. That is, the system compares the magnitude of the state changes of the input which just changed, to the magnitudes of the states of the remaining adjacent and enabled inputs which have not changed, in the order in which a forward-moving object would cause inputs to switch to a particular state. For each comparison, the value of the direction variable is (a) incremented by a fixed amount to indicate a forward-moving object, or (b) decremented by the fixed amount to indicate a reverse-moving object.

The system monitors the order of state changes for all inputs until all inputs return to their lowest state. For a forward moving object, this return of the inputs to their lowest state indicates that the moving object has moved past the sensor. After the object is no longer triggering the sensor, a direction of movement is assigned to the moving object on the basis of the final value of the direction variable.

The step of comparing the magnitude of the state changes may comprise evaluating a plurality of arrays, each array representing a particular state and having a plurality of elements, each element representing a particular input, and the value stored in each element representing the order in which the particular input transitioned to that particular state in comparison to its immediately adjacent and enabled inputs.

The step of comparing the magnitude of state changes may involve comparing the states of inputs which are immediately adjacent and enabled to the particular input which changed states.

Many embodiments of the invention, as discussed above, will be evident to be common for multiple aspects of the invention. Other aspects and advantages of the invention will be apparent from the description below.

BRIEF DESCRIPTION OF THE FIGURE

FIG. 1 illustrates the overall process for determining the direction of a moving object in accordance with an embodiment of the present invention.

DETAILED DESCRIPTION OF THE INVENTION

The present invention is directed to a computer-implemented method for determining the direction of a moving object across a sensor having a plurality of inputs. The system typically comprises a computer system in which one or more sensors are connected. The connection between a sensor and the computer can be hard-wired or wireless using any kind of wireless technology such as WiFi, infrared, Bluetooth, near field communications (NFC), contactless, or other communication means. In particular embodiments of the invention, a plurality of sensors are in use and connected to the computer system.

The computer system may contain a processor, an input device such as a keyboard or mouse, memory such as a hard drive and volatile or nonvolatile memory, and computer code for the functioning of the invention. The computer may also comprise a programmable printed circuit board, microcontroller, or other device for receiving and processing data signals received from the one or more sensors. The computer system may be a conventional desktop, laptop, or tablet computer which is pre-loaded with the required computer code or software, or it may be a custom-designed computer. The computer system may be a single computer which performs the steps of the invention, or it may comprise a plurality of computers, such as a server/client. In certain embodiments, a plurality of clients can be connected to a single server. The computer system may also be networked with other computers over a local area network (LAN) connection or via an Internet connection. The system may also comprise a backup system which retains a copy of the data obtained by the invention.

A client computer can have its own processor, input means, and memory, or it may be a dumb terminal which does not have its own independent processing capabilities, but relies on the computational resources of another computer, such as a server, to which it is connected or networked. In one embodiment, the client system is a tablet or laptop. Depending on the particular implementation of the invention, a client system can contain the necessary computer code to assume control of the system if such a need arises.

The components of the computer system may be conventional, although the system will generally be custom-configured for each particular implementation. The computer system may run on any particular architecture, for example, personal/microcomputer, minicomputer, or mainframe systems. Operating systems may include Apple OSX and iOS, Microsoft Windows, and UNIX/Linux; SPARC, POWER and Itanium-based systems; and z/Architecture and System/360.

The computer code to perform the invention may be written in any programming language, such as but not limited to C/C++, Objective-C, Java, Basic/VisualBasic, or assembler. The computer code may also be written in a proprietary computer language which is specific to the manufacturer of a circuit board, microcontroller, or other computer hardware component used in conjunction with the invention. The runtime, installation files, or other computer code of the present invention may also be sold commercially or be sold pre-installed on a circuit board, microcontroller, or other computer hardware component.

The expression "moving across a sensor" is intended to encompass any object engaging in any means of movement across or past a sensor. The sensors employed in the invention may be placed in any suitable location for detecting movement of the object. For example, the sensors may be placed over, under, next to, or embedded in a surface along which the moving object is traveling. The object can be moving in any direction in relation to the sensor, for example, parallel, perpendicular, or another direction. The surface may be a road surface and the object may be moving on top of the road, or the surface may be a wall surface and the object will be traveling parallel or alongside the wall surface. In certain embodiments, the sensor can also be mounted on the side, bottom/floor, or top/roof of the moving object. Other mounting positions are also possible and encompassed by the invention. The sensors may be permanently fixed in position, or their position may be movable in response to variable object or traffic patterns. Alternatively, the sensor can be a multipart sensor, with one part mounted on the moving object and another part mounted on a stationary surface or another surface. As the object moves past the second part of the sensor, the two portions of the sensor together generate the signals used in the performance of the invention.

The sensor may operate on any kind of engineering principles such as, but not limited to, electromechanical, optical, or magnetic inputs. In an embodiment of the invention, the sensor may be a treadle pad as is known in the art, that is, an electromechanical device which detects an object moving or crossing thereover, and outputs a signal to indicate such detection. The sensor may also operate on optical or magnetic principles. For example, the sensor may be a photoelectric sensor, laser sensor, or magnetic sensor which is mounted on the road surface or on a side wall. As the moving object crosses the sensor, the sensor detects movement and outputs signals to the computer system for determination of the direction of movement in accordance with the principles of the invention.

In one embodiment of the invention, the sensor is a treadle pad which is composed of a series of treadle strips/inputs. A treadle strip/input is essentially a pressure sensitive switch. The pressure sensitive switch will close as a vehicle's wheel passes across it, and open once the wheel is no longer present. On/Off signals produced by treadle strips/inputs can be transmitted via copper wire or any other desired transmission medium to a treadle interface card contemplated by an embodiment of this invention. As an example, treadle pads such as those manufactured or distributed by TRMI Systems Integration/The Revenue Markets, Inc. (New York), Sensor Line (Germany), or International Road Dynamics (Canada) can be used in conjunction with a programmed treadle card in performing the present invention. Treadle strips typically have binary outputs, although ternary and higher outputs, and continuous outputs within a range of values, are encompassed by the present invention.

As mentioned above, the method may comprise detecting the presence of the moving object by a microcontroller using a secondary sensor, which may operate on the same or different operating principle as the primary sensor. For example, the primary sensor can operate on electro-mechanical principles and the secondary sensor can be non-mechanical, not require material deformation, and operate on inductive, thermal, or optical principles to detect an object presence. The invention can also include embodiments comprising three or more separate sensors. Such embodiments comprising a plurality of sensors are to be understood as being encompassed by the term "secondary sensor".

The secondary sensor will typically be placed in a location such that the moving object concurrently triggers both sensors. The microcontroller card or computer will use the data from the secondary sensor to facilitate determination of the direction of movement of the object. The secondary sensor can be used merely to determine the presence or absence of an object, or the inputs from the secondary sensor can be used in the calculation of the direction of the moving object.

An input timeout feature or short circuit logic can optionally be used in combination with a secondary sensor. In embodiments comprising a timeout feature, if an input remains in a state other than the lowest possible state for a predefined period of time, then that input can cease to be tracked. Should the input subsequently switch to another state, then that input can be once again tracked. This timeout mechanism feature can be enabled and disabled. In embodiments with a secondary sensor, if the secondary sensor determines the presence of an object, then the timeout mechanism can be disabled. Should the secondary sensor indicate the absence of an object, then the timeout mechanism can be enabled.

A preferred embodiment of the invention utilizes an algorithm that processes data received from multi-state inputs to return the direction of a moving object. The state of each input can take on different values having magnitudes that are spread from lowest to highest. A high magnitude is indicative of object presence and a low magnitude is indicative of object absence. The inputs may be discrete or they may be continuous. Examples of such inputs are electromechanical switches (discrete) or analog sensors (continuous). In the case of a continuous input, the states would be predefined intervals within the entire range of values the continuous input can report. Complete absence of an object is reflected by a predetermined state of the inputs, which may be the lowest state in the example provided. For ease of discussion, the examples presented below will refer to sensors providing binary output (Low/High), although the invention is equally applicable to sensors which provide a plurality of output states, such as ternary (e.g. Low/Middle/High) output, quaternary (Low/Middle1/Middle2/High) output, or higher-numbered output states. The invention is also applicable to sensors which provide outputs in a continuum of values ranging from a lowest value to a highest value. The range of the continuum can be determined by the manufacturer of the sensor, or this range can be modified to suit the particular implementation of the present invention.

The algorithm may reside on a reconfigurable device, such as a microcontroller that is integrated on a printed circuit board (PCB). Such a PCB would directly or indirectly receive input from the sensor(s), and be capable of outputting the overall direction to an external device, such as a computer system (previously described). The computer code can be uploaded or compiled onto the microcontroller. Alternatively, the algorithm may reside in computer memory. Such a computer would directly or indirectly receive input from the sensor(s), and be capable of outputting the overall direction to a separate process within the computer or to an external device. The computer code may also reside on a reconfigurable programmable logic device, such as a complex programmable logic device, field-programmable gate array, or other comparable device which allows for at-will configuration of the computer code.

The algorithm to determine the direction of the moving object is driven by the subsequent changes in the state of the inputs. Whenever a particular input's state changes, the value assigned to that change of state is compared to the values of the remaining inputs, and each of these comparisons results in either an addition to or subtraction from a direction variable. Addition or subtraction takes place upon each comparison if the comparison of the magnitudes indicates that the object was moving in a positive or negative direction, respectively, as further discussed below. The algorithm will output a direction once the inputs return to an overall state that indicates an object is no longer present (e.g., all inputs have a Low state) or if some other predefined condition is met, depending on the particular application. This other predefined condition may be any other chosen state characteristic/combination of the inputs as defined by their relative and/or respective magnitudes.

The following is an arithmetic explanation of an embodiment of the algorithm. Let the direction of a moving object=D, and the state of each input=i1, i2, i3, . . . iN, where N is the quantity of inputs, which are labeled in the order in which the input state changes to a higher magnitude when an object is moving in a positive direction. The value of D is initially 0, and D is increased or decreased by a predefined amount (e.g., +/−1) when an input's state changes and the magnitude of its state is compared to that of the other inputs.

An aspect of an embodiment may take a two-state four-input system, for example, whereby the initial state of the inputs is i1=Low, i2=Low, i3=Low, and i4=Low because there is no object present, and D=0. As an object begins to move across the four-input system, i1 changes from a Low to a High state, and the state of all inputs is now i1=High, i2=Low, i3=Low, and i4=Low. Upon the change in state of i1, the algorithm makes three comparisons of i1, namely i1 & i2, i1 & i3, and i1 & i4. Each comparison will yield an increase of +1 to variable D because the object's presence indicates a positive direction by virtue of the lower numbered input, i1, changing to a High state before the subsequent inputs, i2, i3, and i4. Hence, variable D will now equal 3. That is, Input #1 is compared to the other inputs that remain in a Low state. Positive three (+3) is the contribution which Input #1 makes to the overall direction vector when it toggles High. The total direction vector will be the sum of all vectors after all the inputs have toggled High and Low. A mathematical equation showing the calculation of D is as follows:

$$D=\{1,2\}+\{1,3\}+\{1,4\}, \text{ where } \{1,2\}=+1, \{1,3\}=+1, \{1,4\}=+1, \text{ therefore } D=1+1+1, D=3$$

Many of these comparisons are executed as the object traverses the sensor/input area, and these comparisons are made when inputs change to both High and Low states. Just as it changing from a Low to a High state before i2 (such that i2 is still Low) indicates a forward moving object, the same is true if it changes from a High to a Low state before i2 (such that i2 is still High). For example, if it changes from a High to a Low state as the object moves past the inputs and i1=Low, i2=High, i3=High, and i4=High. Three comparisons will take place again, namely i1 & i2, i1 & i3, and i1 & i4. Because the lower numbered input changed to a Low state before the subsequent inputs, this also indicates a positive direction and +3 will again be added to D.

The final value of D will be reported once all inputs return to an overall state that indicates an object is no longer present (e.g., i1=Low, i2=Low, i3=Low, and i4=Low). In general, positive (D>0), negative (D<0) or zero (D=0) value for D will be interpreted as a positive (e.g., forward), negative (e.g., reverse), or undetermined direction, respectively. In certain embodiments, a customizable confidence level threshold can be programmed into the system, as discussed above. The confidence level threshold can be set up via software or hardware.

As demonstrated above, once any input undergoes a state change (i.e., from Low to High or vice versa), the algorithm compares the state of that input to the state of the other inputs to further adjust the variable D. So, for example, if it switches from High to Low, triggering the algorithm, such that i1=Low, i2=High, i3=High, and i4=Low, then comparing i1 & i2=+1 (because i1, the lower numbered input switched to Low before i2, a higher numbered input, indicating forward direction), i1 & i3=+1, and i1 & i4=0 (because the states of i1 and i4 are the same). So, +2 would be added to the value for D in this example.

In accordance with an embodiment of the invention, the process remains idle while all inputs are at their lowest state. Once an input changes to a higher state, the algorithm tracks the order in which inputs transition to each state. In the case where an input transitions to a particular state more than once, only the most recent transition is recorded. This tracking continues until all inputs return to their lowest state. For N number of inputs, each with K number of states, the tracking process utilizes K number of arrays with each array having N number of elements. Each array represents a particular state, each element within an array represents a particular input, and the value stored in each element indicates the order in which a particular input transitioned to that particular state in comparison to the other inputs. The default value of an element is zero; this value will remain unchanged for any input that remains in the lowest state during the entire tracking process.

These arrays are passed to a direction analysis process. This process iterates through each array. The analysis consists of comparing all elements with non-zero value in the order a forward moving object would cause inputs to switch to that particular state. Each comparison that is indicative of a forward moving object increments a direction variable by 1. In contrast, each comparison that is indicative of an object moving in reverse decrements the direction variable by 1. All comparisons for all arrays update the same direction variable. The final value of the direction variable will determine the overall direction of the object, namely, forward, reverse, or undetermined.

An example of a system contemplated within a preferred embodiment of the invention is further illustrated by FIG. 1. Four sequentially located two-state pressure sensitive strips/inputs 1, 2, 3, 4 are used to calculate the direction of a vehicle axle. These pressure sensitive strips/inputs 1, 2, 3, 4 may be part of a treadle pad (see below). The strips/inputs 1, 2, 3, 4 are labeled in the order a forward moving vehicle would toggle them. There are six combinations of strip/input pairs: {1,2}, {1,3}, {1,4}, {2,3}, {2,4}, and {3,4}. Assuming a strip/input pair initially has the same state (e.g., both are Low or High), the Direction Algorithm assigns a vector value of +1 to a strip/input pair if the lower numbered strip/input toggles first, and a vector value of −1 to a strip/input pair if the higher numbered strip/input toggles first. For example, if strip/input 1 is the first to toggle, then {1,2}=+1, {1,3}=+1, and {1,4}=+1. On the other hand, if strip/input 2 was to toggle first, then {1,2}=−1, {2,3}=+1, and {2,4}=+1.

The above example of a four-input system will output D=+12 for an object moving in the positive direction, and D=−12 for an object moving in the negative direction, assuming there are no anomalies present and all inputs switch from a Low to a High state in the order a vehicle is moving, and after all inputs are switched to that High state, each switch to a Low state in that same order. In practice, in accordance with one embodiment of the invention, the system may output a different value of D within the range of −12 to +12 if, for example, there are anomalies present (e.g., a defective input) or some of the inputs switch back to a Low state before they all switch from Low to High. Taking into account the expected output for D in a given system without anomalies, the user can set a confidence level threshold that is appropriate to the application at hand to adjust the degree of confidence desired. For example, D=+10 may be deemed a positive direction, but D=+8 may be deemed to be undetermined (and similarly, D=−10 may be deemed a negative direction, but D=−8 may be deemed to be undetermined). Therefore, the user can set a range of values for D such that a direction is undetermined (e.g., if the absolute value of D is <=8), requiring a higher absolute value for D for the algorithm to report a direction.

The following are further examples of calculations which the Direction Algorithm in FIG. 1 could process. In each example, the Strip Sequence indicates the only state change for the group of strips/inputs for a particular point in time, with all strips/inputs starting at a Low state. Each example would require two arrays, each array having four elements, each element corresponding to a particular strip. Element No. 1 corresponds to strip no. 1; element no. 2 corresponds to strip no. 2, and so on.

Forward Direction Axle:
Strip Sequence=1-High, 2-High, 3-High, 4-High, 1-Low, 2-Low, 3-Low, 4-Low
High Array=[1,2,3,4]
Low Array=[1,2,3,4]
High Sequence Vector Analysis:
{1,2}=+1, {1,3}=+1, {1,4}=+1, {2,3}=+1, {2,4}=+1, {3,4}=+1
Low Sequence Vector Analysis:
{1,2}=+1, {1,3}=+1, {1,4}=+1, {2,3}=+1, {2,4}=+1, {3,4}=+1
Total Vector=+12. The Direction Algorithm returns a forward direction.

Reverse Direction Axle:
Strip Sequence=4-High, 3-High, 2-High, 1-High, 4-Low, 3-Low, 2-Low, 1-Low
High Array=[4,3,2,1]
Low Array=[4,3,2,1]
High Sequence Vector Analysis:
{1,2}=−1, {1,3}=−1, {1,4}=−1, {2,3}=−1, {2,4}=−1, {3,4}=−1
Low Sequence Vector Analysis:
{1,2}=−1, {1,3}=−1, {1,4}=−1, {2,3}=−1, {2,4}=−1, {3,4}=−1
Total Vector=−12. The Direction Algorithm returns a reverse direction.

Unknown Direction Axle:
Strip Sequence=1-High, 2-High, 3-High, 4-High, 4-Low, 3-Low, 2-Low, 1-Low
High Array=[1,2,3,4]
Low Array=[4,3,2,1]
High Sequence Vector Analysis:
{1,2}=+1, {1,3}=+1, {1,4}=+1, {2,3}=+1, {2,4}=+1, {3,4}=+1
Low Sequence Vector Analysis:
{1,2}=−1, {1,3}=−1, {1,4}=−1, {2,3}=−1, {2,4}=−1, {3,4}=−1
Total Vector=0. The Direction Algorithm returns an unknown direction.

Forward Direction Axle with Strip/Input 2 Failing to Toggle:
Strip Sequence=1-High, 3-High, 4-High, 1-Low, 4-Low, 3-Low
High Array=[1,0,2,3]
Low Array=[1,0,3,2]
High Sequence Vector Analysis: {1,3}=+1, {1,4}=+1, {3,4}=+1
Low Sequence Vector Analysis: {1,3}=+1, {1,4}=+1, {3,4}=−1
Total Vector=+4. The Direction Algorithm returns a forward direction.

As previously discussed, the array elements are variables which store values that represent the order in which the corresponding input changed to a specific state relative to the rest of the inputs. For example, if a four-input binary system initially had all inputs at the lowest state, and Input #2 were to switch to a High state, then the High Array would take on the following value: [0,1,0,0]. If Input #1 were to switch to a High state next, then the High Array's value would be updated to the following: [2,1,0,0]. Should Input #3 and then Input #4 follow the same pattern, then the value of the High Array would become: [2,1,3,4].

An embodiment of the Direction Algorithm in FIG. 1 can be programmed with a treadle card that may consist, for example, of a microcontroller that is integrated on a printed circuit board with its corresponding i/o circuits and power circuits, such that it will implement the direction process to calculate axle direction. The microcontroller could house the program, microcontroller programming techniques being apparent to those skilled in the field of the invention, and utilize the other peripherals to receive the inputs and subsequently output the result to a desired device.

The vector analysis of the state changes has two parts: strips/inputs toggle to a High state as a wheel rolls onto a treadle pad, and strips/inputs toggle to a Low state as a wheel rolls off the treadle pad. The Direction Algorithm adds vectors when strips/inputs toggle High and strips/inputs toggle Low. As a result, the Direction Algorithm adds a total of twelve vectors to calculate a final vector result. This vector result indicates the direction of the axle. Three possible directions can be reported by the Direction Algorithm: forward, reverse, and unknown.

The Direction Algorithm in this example is initiated when at least one of the enabled strips/inputs toggles to High state, and terminates once all of the enabled strips/inputs toggle to Low state. It is not necessary that all enabled strips/inputs toggle. Hence, if one or more of the enabled strips/inputs fail to toggle, the axle direction can still be computed. Since a minimum of two enabled strips/inputs are necessary to compute direction, in cases where there is only a single strip/input, each toggle of that strip can be assumed to be, and reported as, a forward axle.

The system can also take into account if an object has not moved completely past a sensor. For example, if an object (such as a wheel of a vehicle) slowly moves onto a sensor (such as a treadle pad) in a forward direction, comes to a stop, and then slowly rolls off in the reverse direction, the object never moves completely past the sensor, and the algorithm can be coded to report an unknown direction for that object. This situation can be identified as a "Revenue-Neutral Unknown" because it has no impact on revenue.

The microcontroller card or overall system can also be programmed to have short circuit logic or a timeout feature as discussed above when evaluating the state of an input. That is, if an input remains in a state other than the lowest possible state for a predefined period of time, then that input can cease to be tracked. Should the input subsequently switch to another state, then that input can be once again tracked. Such a timeout mechanism feature can be enabled and disabled as deemed appropriate.

EXAMPLE

A laboratory bench test system was used to simulate a field arrangement of vehicles moving across a sensor in accordance with an embodiment of the present invention. The simulation determines the presence and direction of movement of the vehicle axles, and reports this information for each object. The simulation has particular relevance to the collection of tolls by an electronic toll-collection system, as accurate detection of objects such as moving vehicle axles is critical for all types of transactions, such as tag, cash, or violation-type transactions. The information calculated by the system in this example can be subsequently passed on to another system (not described herein) for calculation of the number of axles possessed by each vehicle or for toll processing.

The detection and determination of the direction of vehicle axles can allow the tolling system to bill a user for any tolls which may be due as a vehicle passes through a toll plaza. The system reports forward and reversal axles of a vehicle in a toll lane so that the vehicle is charged the correct amount.

The simulation compared detection of vehicle axles using an XAI card and an SLI card. The XAI (extremely accurate interface) card is a microcontroller contains vector analysis computer processing code in accordance with an embodiment of the invention compiled on a commercially-available Propeller™ professional development board. The SLI (serial lane interface) card is a commercially-available serial lane interface card (Model No. TRMI 4200MP) manufactured by TRMI. The SLI card uses truth tables in its algorithm. The two cards were used in parallel during the simulation and the resultant data was compared.

The testing equipment consisted of the following components:
XAI card;
SLI card;
Dipswitch block;
Breadboard;
Terminal block;
190 ft reel of orange cable; and 6 ft Cat5 cable;
Two Serial to USB cables
3-port RJ45 tap; and
Serial monitoring software.

The dipswitch block was used to simulate vehicles crossing a treadle pad installed on a road. The system reported strip states via the Serial to USB cables, and ultimately a calculated axle was reported after each strip sequence. A calculated axle can take on one of these three values: forward (FF), reverse (RR), or unknown (UU). The dipswitches were toggled manually in an order that would provide the system with sequences of signals for forward and reverse axles.

The test simulated the movement of approximately 1,450 axles over a treadle pad, and the results are provided in Table 1 below:

TABLE 1

| Direction | XAI | SLI | |
|---|---|---|---|
| FF | 1,202 | 1,103 ==> | Forward Axle |
| RR | 244 | 199 ==> | Reverse Axle |
| UU | 38 | 252 ==> | Unknown Axle |
| Tot. Msgs | 13,377 | 15,089 | |
| RN-UU | 38 | 108 ==> | Revenue-Neutral Unknowns |
| RA-UU | 0 | 144 ==> | Revenue-Adverse Unknowns |
| RA-FF | 0 | 1 ==> | Revenue-Adverse Forwards |
| RA-RR | 0 | 2 ==> | Revenue-Adverse Reversals |
| C/B | 2 | 1,665 ==> | Crosstalk/Bounce |

Although the inputs were feeding to the same cards, the results show that the XAI card registered 13,377 separate messages, that is, state changes, while the SLI card detected 15,089 state changes. After subtracting of the crosstalk/bounce, the total number of state changes is about the same for both cards, at 13,375 for the XAI card and at 13,424 for the SLI card.

The data shows that the XAI card, containing an implementation of the present invention, was able to filter out significantly more noise than the SLI card, which used the inferior truth table algorithm. The XAI card detected a total of 1446 axles (FF+RR=1,202+244), while the SLI card reported only 1301 axles (FF+RR=1103+199), of which 3 were Revenue-Adverse. Accordingly, the present invention was practically unaffected by noise, and performed with higher accuracy, as compared to the SLI card.

The four switches on the dipswitch block were normally in the Low or Off state. Forward axles were simulated by toggling each of the four switches to the On/High state, and then back to the Off/Low state to produce the following sequence: H1, H2, H3, H4, L1, L2, L3, L4. A number of reverse axles were also simulated by toggling each of the four switches On/High then Off/Low to produce the following sequence:

H4, H3, H2, H1, L4, L3, L2, L1. The algorithm residing on the XAI card updated both High and Low arrays, each array consisting of four elements, until all enabled inputs returned to a Low state. Forward Axles resulted in the following two arrays: High Array [1,2,3,4] and Low Array [1,2,3,4]. Reverse Axles resulted in the following two arrays: High Array [4,3,2,1] and Low Array [4,3,2,1]. The High and Low arrays were then individually examined by the algorithm to calculate direction vectors.

The analysis consisted of comparing element pairs in each array, namely, [1,2], [1,3], [1,4], [2,3], [2,4], and [3,4]. In the case of a forward axle, each comparison resulted in a direction vector of +1. Hence, the total vector for both High and Low arrays was +12 for a Forward Axle. The same approach is applicable to reverse axles, except that each comparison yielded a direction vector value of −1 and thus the total direction vector was equal to −12. The total direction vector determined the direction reported for each simulated axle. In the case of +12, a Forward Axle (FF) was reported, and in the case of −12, a Reverse Axle (RR) was reported. Depending on the confidence level threshold configured on the XAI card, other values other than +12 or −12 may still have reported FF or RR if they fell within the chosen confidence level threshold. Any values not within the confidence level threshold resulted in Unknown (UU) axles being reported.

For toll collection purposes, the unknown axles would be disregarded. Revenue-Neutral Unknowns (RN-UU) are the result of line noise causing the card to report unknown axles for non-existent axles. Hence these unknown axles have no impact on revenue. Crosstalk/Bounce (C/B) may be considered as line noise within the system and can indeed have an adverse effect on axle detection. The XAI card comprises debouncing logic that filters out most of the Crosstalk/Bounce, whereas the SLI card does not. The XAI card's ability to establish a confidence level threshold allows the direction algorithm to be unaffected by Crosstalk/Bounce that occasionally bypasses the filter of only a fraction of the inputs.

The Revenue-Adverse data (Revenue-Adverse Unknowns [RA-UU], Revenue-Adverse Forwards [RA-FF], and Revenue-Adverse Reversals [RA-RR]) are important to the simulation as they can have a direct impact on revenue.

Revenue-Adverse Unknowns result when the system cannot determine the direction of an axle when there is presumably sufficient information, that is, an axle did in fact cross the sensor, but the card is unable to successfully calculate its direction with the available information, and therefore that axle is not reported.

Revenue-Adverse Forwards can be considered as a double-count for a particular vehicle (two FF which would be treated by the toll system as a double-charge). Revenue-Adverse Forwards can be the result of Crosstalk/Bounce generating a "phantom" forward axle, or a legitimate reverse axle being incorrectly assessed by the card as a forward axle. In actual use, the detection of a Revenue-Adverse Forward would produce either of the two following scenarios: 1) a vehicle will be assigned more axles than it actually has and thus possibly be overcharged, or 2) so many forward axles are assigned to a single vehicle that the entire transaction must be discarded and thus no toll is collected.

Revenue-Adverse Reverses can be the result of Crosstalk/Bounce generating a "phantom" reverse axle, or a legitimate forward axle being incorrectly assessed by the card as a reverse axle. In actual use, the detection of a Revenue-Adverse Reverse can produce either of the two following scenarios: 1) a vehicle will be assigned fewer axles than it actually has and thus possibly be undercharged, or 2) so many reverse axles are assigned to a single vehicle that the entire transaction must be discarded and thus no toll is collected.

The above aspects of the invention generally directed to determining the direction of a moving object across a sensor having a plurality of inputs, and monitoring state changes of each of the inputs as the moving object passes across the sensor.

Additional aspects of the invention are directed to determining the direction of the moving object across the sensor by monitoring state changes of immediately adjacent and enabled inputs rather than all of the inputs of the sensor. That is, when the system detects a moving object across a sensor, the system will determine the direction of movement by evaluating state changes of immediately adjacent and enabled sensors.

An example of a system contemplated within this aspect of the invention is further illustrated by reference to FIG. 1, which is applicable to multiple aspects of the invention. Four sequentially located two-state pressure sensitive strips/inputs 1, 2, 3, 4 are used to calculate the direction of a vehicle axle. These pressure sensitive strips/inputs 1, 2, 3, 4 may be part of a treadle pad (see below). The strips/inputs 1, 2, 3, 4 are labeled in the order a forward moving vehicle would toggle them. However, only logically adjacent strip pairs are used to compute direction. Logically adjacent strip pairs are the enabled strips whose toggles occur in immediate succession for a forward or reverse moving object.

There are six combinations of strip/input pairs possible: {1,2}, {1,3}, {1,4}, {2,3}, {2,4}, and {3,4}. If strips/inputs 1,2,3,4 are all enabled, then in accordance with this aspect of the invention, only combination pairs {1,2},{2,3}, and {3,4} are used to compute direction. In the case where a particular strip/input is disabled, the disabled strip/input will be disregarded and the functioning inputs on both sides of the disabled input will be used to compute direction. For example, if strip/input 2 is disabled, then only combinations {1,3} and {3,4} are used to compute direction.

Assuming a strip/input pair initially has the same state (e.g., both are Low or High), the Direction Algorithm assigns a vector value of +1 to a strip/input pair if the lower numbered strip/input toggles first, and a vector value of −1 to a strip/input pair if the higher numbered strip/input toggles first. For example, if strip/input 1 is the first to toggle, then {1,2}=+1, {2,3}=+1, and {3,4}=+1. On the other hand, if strip/input 2 was to toggle first, then {1,2}=−1, {2,3}=+1, and {3,4}=+1.

The above example of a four-input system will output D=+6 for an object moving in the positive direction, and D=−6 for an object moving in the negative direction, assuming there are no anomalies present and all inputs switch from a Low to a High state in the order a vehicle is moving, and after all inputs are switched to that High state, each switch to a Low state in that same order. In practice, in accordance with one embodiment of the invention, the system may output a different value of D within the range of −6 to +6 if, for example, there are anomalies present (e.g., a defective input) or some of the inputs switch back to a Low state before they all switch from Low to High. Taking into account the expected output for D in a given system without anomalies, the user can set a confidence level threshold that is appropriate to the application at hand to adjust the degree of confidence desired. For example, D=+4 may be deemed a positive direction, but D=+2 may be deemed to be undetermined (and similarly, D=−4 may be deemed a negative direction, but D=−2 may be deemed to be undetermined). Therefore, the user can set a range of values for D such that a direction is undetermined (e.g., if the absolute value of D is <=4), requiring a higher absolute value for D for the algorithm to report a direction.

The following are further examples of calculations which the Direction Algorithm in FIG. 1 could process. In each example, the Strip Sequence indicates the only state change for the group of strips/inputs for a particular point in time, with all strips/inputs starting at a Low state. Each example would require two arrays, each array having four elements, each element corresponding to a particular strip. Element No. 1 corresponds to strip no. 1; element no. 2 corresponds to strip no. 2, and so on.

Forward Direction Axle:
Strip Sequence=1-High, 2-High, 3-High, 4-High, 1-Low, 2-Low, 3-Low, 4-Low
High Array=[1,2,3,4]
Low Array=[1,2,3,4]
High Sequence Vector Analysis:
{1,2}=+1, {2,3}=+1, {3,4}=+1
Low Sequence Vector Analysis:
{1,2}=+1, {2,3}=+1, {3,4}=+1
Total Vector=+6. The Direction Algorithm returns a forward direction.

Reverse Direction Axle:
Strip Sequence=4-High, 3-High, 2-High, 1-High, 4-Low, 3-Low, 2-Low, 1-Low
High Array=[4,3,2,1]
Low Array=[4,3,2,1]
High Sequence Vector Analysis:
{1,2}=−1, {2,3}=−1, {3,4}=−1
Low Sequence Vector Analysis:
{1,2}=−1, {2,3}=−1, {3,4}=−1
Total Vector=−6. The Direction Algorithm returns a reverse direction.

Unknown Direction Axle:
Strip Sequence=1-High, 2-High, 3-High, 4-High, 4-Low, 3-Low, 2-Low, 1-Low
High Array=[1,2,3,4]
Low Array=[4,3,2,1]
High Sequence Vector Analysis:
{1,2}=+1, {2,3}=+1, {3,4}=+1
Low Sequence Vector Analysis:
{1,2}=−1, {2,3}=−1, {3,4}=−1
Total Vector=0. The Direction Algorithm returns an unknown direction.

Forward Direction Axle with Strip/Input 2 Failing to Toggle:
Strip Sequence=1-High, 3-High, 4-High, 1-Low, 4-Low, 3-Low
High Array=[1,0,2,3]
Low Array=[1,0,2,3]
High Sequence Vector Analysis: {3,4}=+1
Low Sequence Vector Analysis: {3,4}=+1
Total Vector=+2. The Direction Algorithm returns a forward direction.

As previously discussed, the array elements are variables which store values that represent the order in which the corresponding input changed to a specific state relative to the rest of the inputs. For example, if a four-input binary system initially had all inputs at the lowest state, and Input #2 were to switch to a High state, then the High Array would take on the following value: [0,1,0,0]. If Input #1 were to switch to a High state next, then the High Array's value would be updated to the following: [2,1,0,0]. Should Input #3 and then Input #4 follow the same pattern, then the value of the High Array would become: [2,1,3,4].

An embodiment of the Direction Algorithm in FIG. 1 can be programmed with a treadle card that may consist, for example, of a microcontroller that is integrated on a printed circuit board with its corresponding i/o circuits and power circuits, such that it will implement the direction process to calculate axle direction. The microcontroller could house the program, microcontroller programming techniques being apparent to those skilled in the field of the invention, and utilize the other peripherals to receive the inputs and subsequently output the result to a desired device.

The vector analysis of the state changes has two parts: strips/inputs toggle to a High state as a wheel rolls onto a treadle pad, and strips/inputs toggle to a Low state as a wheel rolls off the treadle pad. The Direction Algorithm calculates each vector once all strips/inputs have returned to a Low state. As a result, the Direction Algorithm adds a total of six vectors to calculate a final vector result. This vector result indicates the direction of the axle. Three possible directions can be reported by the Direction Algorithm: forward, reverse, and unknown.

The Direction Algorithm in this example is initiated when at least one of the enabled strips/inputs toggles to High state, and terminates once all of the enabled strips/inputs toggle to Low state. It is not necessary that all enabled strips/inputs toggle. Hence, if one or more of the enabled strips/inputs fail to toggle, the axle direction can still be computed. Since a minimum of two enabled strips/inputs is necessary to compute direction, in cases where there is only a single strip/input, each toggle of that strip can be assumed to be, and reported as, a forward axle.

The system can also take into account if an object has not moved completely past a sensor. For example, if an object (such as a wheel of a vehicle) slowly moves onto a sensor (such as a treadle pad) in a forward direction, comes to a stop, and then slowly rolls off in the reverse direction, the object never moves completely past the sensor, and the algorithm can be coded to report an unknown direction for that object. This situation can be identified as a "Revenue-Neutral Unknown" because it has no impact on revenue.

The present invention can be used for gathering traffic data and for toll calculation. The invention can also be used for security purposes, for example, to monitor vehicles to ensure that they move in a particular direction, such as forward or reverse, and do not move in a direction which is contrary to the direction of traffic flow.

Advantageously, the present invention has much greater accuracy than prior art methods which employ truth tables, and the costs of the present invention are competitive to such prior art methods. Methods using truth tables rely on looking up predefined sequences that are stored in memory. Should a passing object generate an abnormal sequence, it is likely that a matching sequence will not be found in memory, and therefore the system will be unable to determine the direction of the moving object. In contrast to using truth tables, the present invention uses vector analysis to "make sense" of the sequences of inputs. The invention can function with just a minimum of two inputs to determine direction, and direction accuracy increases as the number of inputs increases.

The present invention offers accuracy of detection which is comparable to the use of neural networks, considered as a high end alternative to truth tables, but at a fraction of the cost of neural networks. Also, neural networks learn by example, which translates to an additional investment of manpower, and their internal logic cannot be reconfigured at will. Advantageously, the invention uses readable computer code which can easily be modified with the appropriate compiler or other suitable means to update the invention as may be deemed advisable.

Other objects, advantages and embodiments of the various aspects of the present invention will be apparent to those who are skilled in the field of the invention and are within the scope of the description and the accompanying FIGURE. For example, but without limitation, structural or functional elements might be rearranged, or method steps reordered, consistent with the present invention. Similarly, sensors may comprise a single instance or a plurality of devices, such plurality possibly encompassing multiple sensor types. The sensor types described in various embodiments are not meant to limit the possible types of sensors that may be used in embodiments of aspects of the present invention, and other types of sensors that may accomplish similar tasks may be implemented as well. Similarly, principles according to the present invention, and methods and systems that embody them, could be applied to other examples, which, even if not specifically described here in detail, would nevertheless be within the scope of the present invention.

What is claimed is:

1. A system for determining the direction of a moving object, the system comprising:
   a sensor having a plurality of inputs and configured to monitor the direction of the moving object as it moves across the sensor, and
   a computer in communication with the sensor, the computer comprising circuitry, memory, and a processor configured to execute non-transient programming instructions which when executed perform the operations of:
   a. assigning an initial value to a direction variable;
   b. monitoring state changes of the inputs as the moving object passes across the sensor;
   c. upon detection of a state change of a particular input from a lowest state to a higher state, comparing the magnitude of the state changes of the particular input to its immediately adjacent and enabled inputs in the order in which a forward-moving object would cause inputs to switch to a particular state;
   d. for each comparison, incrementing the value of the direction variable by a fixed amount to indicate a forward-moving object, and decrementing the value of the direction variable by the fixed amount to indicate a reverse-moving object;
   e. monitoring the order of state changes for all inputs until all inputs return to their lowest state and thereby indicating passage of the moving object; and
   f. assigning a direction of movement to the moving object on the basis of the final value of the direction variable after the object has moved past the sensor.

2. The system according to claim 1, wherein the moving object is a vehicle or a part thereof.

3. The system according to claim 1, wherein the sensor is a treadle pad, or a set of electromechanical or optical inputs.

4. The system according to claim 1, wherein the sensor is affixed to, suspended over, or mounted along the side of a road, street, wall, or ceiling surface during use of the system.

5. The system according to claim 1, wherein the operation of comparing the magnitude of the state changes comprises evaluating a plurality of arrays, each array representing a particular state and having a plurality of elements, each element representing a particular input, and the value stored in each element representing the order in which the particular input transitioned to that particular state in comparison to its immediately adjacent and enabled inputs.

6. The system according to claim 5, wherein the processor is further configured to perform the operation of recording only the most recent state change if a particular input undergoes a plurality of state changes.

7. The system according to claim 1, wherein the inputs are discrete or continuous.

8. The system according to claim 1, wherein the processor is further configured to perform the operations of ceasing to monitor a particular input if the input remains in a state other than a lowest possible state for a predefined period of time and reestablishing monitoring of the particular input if the input subsequently switches to another state.

9. The system according to claim 1, wherein the system further comprises a secondary sensor which functions on the same or different operating principle as a primary sensor, and the processor is further configured to perform the operation of detecting the presence of the moving object using the secondary sensor.

10. The system according to claim 1, wherein the processor is further configured to perform the operations of comparing the final value of the direction variable to a pre-assigned confidence level threshold, and assigning the direction of movement to the moving object if the direction variable is outside the confidence level threshold.

11. The system according to claim 1, wherein the processor is a microcontroller located on a printed circuit board, and the microcontroller is programmed with the programming instructions.

12. The system according to claim 1, wherein the programming instructions are performed by the computer.

13. The system according to claim 1, wherein the processor is further configured to perform the operation of outputting the direction of the moving object to an external device selected from the group consisting of a printer, database, spreadsheet, computer monitor, and data storage unit.

14. The system according to claim 1, wherein the processor is further configured to perform the operation of outputting the direction of the moving object to a subsequent separate computer process.

15. A computer program product comprising a computer-readable medium having non-transient computer readable programming instructions embodied therein which when executed cause a computer equipped with circuitry, memory, and a processor to determine the direction of a moving object across a sensor electrically connected to the processor, the programming instructions causing the processor to perform the operations of:
   a. assigning an initial value to a direction variable;
   b. monitoring state changes of the inputs as the moving object passes across the sensor;
   c. upon detection of a state change of a particular input from a lowest state to a higher state, comparing the magnitude of the state changes of the particular input to its immediately adjacent and enabled inputs in the order in which a forward-moving object would cause inputs to switch to a particular state;
   d. for each comparison, incrementing the value of the direction variable by a fixed amount to indicate a forward-moving object, and decrementing the value of the direction variable by the fixed amount to indicate a reverse-moving object;
   e. monitoring the order of state changes for all inputs until all inputs return to their lowest state and thereby indicating passage of the moving object; and
   f. assigning a direction of movement to the moving object on the basis of the final value of the direction variable after the object has moved past the sensor.

16. The computer program product according to claim 15, wherein the computer program product is a programmable printed circuit board or a computer-readable storage medium.

\* \* \* \* \*